United States Patent [19]
Imoto et al.

[11] Patent Number: 6,025,298
[45] Date of Patent: Feb. 15, 2000

[54] CATALYST AND PROCESS FOR THE PRODUCTION THEREOF

[75] Inventors: Kiyoaki Imoto; Jun Tanabe, both of Kanagawa; Osamu Naito, Nagasaki; Atsushi Morii, Nagasaki; Shuya Nagayama, Nagasaki, all of Japan

[73] Assignees: Nichias Corporation; Mitsubishi Heavy Industries, Ltd., both of Tokyo, Japan

[21] Appl. No.: 09/243,446

[22] Filed: Feb. 3, 1999

[30] Foreign Application Priority Data

Feb. 3, 1998 [JP] Japan .................................. 10-22152

[51] Int. Cl.⁷ ...................................................... B01J 23/00
[52] U.S. Cl. .......................... 502/300; 502/305; 502/308; 502/309; 502/321; 502/322; 502/323; 502/349; 502/350; 502/351; 502/355; 502/240; 502/242; 502/246; 502/247; 502/248
[58] Field of Search ...................................... 502/300, 305, 502/308, 309, 321, 322, 323, 349, 350, 351, 355, 242, 240, 246, 247, 248

[56] References Cited

U.S. PATENT DOCUMENTS

| 4,195,063 | 3/1980 | Iwaoka et al. | 422/180 |
| 5,051,391 | 9/1991 | Tomisawa et al. | 502/242 |
| 5,155,083 | 10/1992 | Yoshida et al. | 502/242 |
| 5,212,131 | 5/1993 | Belding | 502/60 |
| 5,294,584 | 3/1994 | Yoshida et al. | 502/242 |

*Primary Examiner*—Elizabeth D. Wood
*Attorney, Agent, or Firm*—Pillsbury Madison & Sutro LLP

[57] ABSTRACT

The present invention provides a denitration catalyst which is designed to show a drop of the mechanical strength of the carrier to an acceptable extent even when used with an exhaust gas containing sulfur oxides while making the use of excellent water resistance or electrical insulating properties inherent to glass fibers and a process therefor. The denitration catalyst comprises a catalytically active component supported on a structure comprising a glass fiber free of $B_2O_3$, an inorganic filler and an inorganic binder.

8 Claims, No Drawings

CATALYST AND PROCESS FOR THE PRODUCTION THEREOF

FIELD OF THE INVENTION

The present invention relates to a catalyst for use in the denitration of an exhaust gas containing sulfur oxides. More particularly, the present invention relates to a denigration catalyst which can be used with less drop of mechanical strength and a process for the production thereof.

BACKGROUND OF THE INVENTION

Among denitration catalysts for use in the removal of nitrogen oxides from an exhaust gas are those which comprise a glass fiber or ceramic fiber as a carrier for the purpose of improving water resistance or electrical insulating properties. In particular, fibers made of glass called E-glass are known to be excellent in water resistance or electrical insulating properties.

However, E-glass fiber contains $B_2O_3$ and thus is disadvantageous in case where the exhaust gas contains sulfur oxides ($SO_3$) since $B_2O_3$ reacts with sulfur oxides to produce metal salts which are then eluted from the fiber matrix to deteriorate the fiber. Further, ceramic fiber is similarly disadvantageous. For example, alumina-containing fiber is liable to the reaction of $Al_2O_3$ with sulfur oxides that causes the deterioration of the fiber. Moreover, since $Al_2O_3$ exists in glass as a main component with $SiO_2$, a carrier made of E-glass fiber is liable to the reaction of both $B_2O_3$ and $Al_2O_3$ with sulfur oxides that causes further deterioration of the carrier.

SUMMARY OF THE INVENTION

It is therefore an object of the present invention to provide a denitration catalyst which is designed to show a drop of the mechanical strength of the carrier to an acceptable extent even when used with an exhaust gas containing sulfur oxides while making the use of excellent water resistance or electrical insulating properties inherent to glass fibers.

It is another object of the present invention to provide a process for the production of the foregoing denitration catalyst.

These and other objects of the present invention will become more apparent from the following detailed description and examples.

These and other objects of the present invention are accomplished by the following aspects of the present invention.

(1) A denitration catalyst, comprising a catalytically active component supported on a structure comprising a glass fiber free of $B_2O_3$, an inorganic filler and an inorganic binder.

(2) The denitration catalyst according to the above item (1), wherein the glass fiber has an $Al_2O_3$ component of from 10 to 19% by weight.

(3) The denitration catalyst according to the item 1 or 2, wherein the glass fiber has a diameter of from 3 to 16 μm.

(4) The denitration catalyst according to any one of items (1) to (3), wherein the inorganic filler is $SiO_2$.

(5) The denitration catalyst according to any one of the items (1) to (4), wherein the inorganic binder comprises at least one of calcined silica sol, calcined zirconia sol and calcined titania sol.

(6) The denitration catalyst according to any one of the items (1) to (5), wherein the structure is honeycomb.

(7) The denitration catalyst according to any one of the items (1) to (6), wherein the catalytically active component comprises at least one of Ti, W, Mo and V oxides.

(8) A process for the production of a denitration catalyst, which comprises the steps of:

subjecting a mixture of a glass fiber free of $B_2O_3$ and a binder to paper making to produce a glass paper, subjecting the glass paper to corrugation processing, laminating or rolling up the glass paper thus processed, applying an inorganic filler to the processed glass paper with an inorganic binder, drying the processed glass paper, subjecting the processed glass paper to heat treatment to thereby obtain a honeycomb structure, allowing a catalytically active component to be supported on the honeycomb structure with an inorganic binder, drying the honeycomb structure, and subjecting the honeycomb structure to heat treatment.

Since the denitration catalyst according to the present invention comprises as a carrier a glass fiber free of $B_2O_3$ and a minimized content of $Al_2O_3$, in case where an exhaust gas to be treated contains sulfur oxides, the denitration catalyst does not cause the progress of reaction of the constituent components of the fiber with sulfur oxides. Accordingly, such a denitration catalyst can prevent the drop of strength of the carrier during use while maintaining both high water resistance and electrical insulating properties inherent to glass fibers.

DETAILED DESCRIPTION OF THE INVENTION

The denitration catalyst and production process of the present invention will be further described hereinafter.

The denitration catalyst according to the present invention comprises a catalytically active component supported on a structure comprising a glass fiber free of $B_2O_3$, an inorganic filler and an inorganic binder.

The content of $Al_2O_3$ in the glass fiber to be used herein is preferably small from the standpoint of prevention of the foregoing reaction with sulfur oxides in an exhaust gas. It is preferably not more than 19% by weight, particularly not more than 15% by weight. If the content of $Al_2O_3$ in the glass fiber exceeds the above defined range, the resulting glass fiber exhibits deteriorated acid resistance. The lower limit of the content of $Al_2O_3$ in the glass fiber is 10% by weight. If the content of $Al_2O_3$ in the glass fiber falls below this lower limit, the resulting glass fiber exhibits deteriorated heat resistance to disadvantage.

The glass components other than $Al_2O_3$ are not specifically limited so far as they form a glass composition which can be rendered fibrous. In practice, however, $SiO_2$ and CaO can be incorporated as main components in an amount of from 50 to 70% by weight and from 15 to 25% by weight, respectively. The rest of the components are metal oxides such as oxides of alkaline metal, alkaline earth metal, titanium, iron and zirconium.

The glass fiber which can be used in the present invention can have almost the same diameter as the glass fibers used as a carrier in the conventional denitration catalysts. In practice, it is preferably from 3 to 16 μm. In particular, if the diameter of glass fiber falls below 3 μm, the resulting carrier can exhibit insufficient strength.

The inorganic filler to be used herein is not specifically limited. The inorganic fillers which have heretofore been incorporated in denitration catalysts having glass fiber as a carrier can be used arbitrarily. In particular, $SiO_2$ powder is preferred. Preferred examples of $SiO_2$ source include fluorite. The amount of the inorganic filler is generally from 20 to 80 kg/m³ of the structure.

The inorganic binder to be used herein is not specifically limited. The inorganic binders which have heretofore been incorporated in denitration catalysts having glass fiber as a carrier can be used arbitrarily. Calcined silica sol, calcined zirconia sol and calcined titania sol can be preferably used singly or in admixture. The amount of the inorganic binder is generally from 20 to 80 kg/m³ of the structure.

The denitration catalyst of the present invention can be obtained by allowing a catalytically active component to be supported on a structure comprising the foregoing glass fiber free of $B_2O_3$, inorganic filler and inorganic binder.

The catalytically active component to be used herein is not specifically limited so far as it has been heretofore used for the purpose of denitration. Preferably, oxides of Ti, W, Mo and V can be used singly or in admixture. Examples of the mixture include a mixture of $TiO_2:WO_3:V_2O_5=90:9:1$ by weight. The process for allowing these catalytically active components to be supported on the carrier is not specifically limited. In practice, however, it is preferably accomplished by impregnating the structure with these catalytically active components together with the inorganic binder. The amount of the catalytically active component to be supported on the carrier is not specifically limited, but is generally from about 50 to 100 kg/m³ of the structure. The amount of the inorganic binder used along with the catalytically active component is generally from 30 to 50 kg/m³ of the structure. After the catalytically active component is supported on the carrier, for example, drying is effected at 170° C. for 30 minutes and heat treatment is effected at 500 to 600° C. for 3 hours.

The process for the production of the structure will be described hereinafter.

Firstly, a solution having a glass fiber free of $B_2O_3$ dispersed in an appropriate binder solution (e.g., polyvinyl alcohol solution) is subjected to paper making to produce a glass paper. The glass paper thus produced is passed through the gap between a pair of corrugated rolls arranged vertically so that it is subjected to corrugation process. The glass paper thus treated is then laminated or rolled up. An inorganic filler (e.g., fluorite) is then applied to the treated glass paper with an inorganic binder (e.g., silica sol). Namely, the glass paper is impregnated with a mixed slurry of the inorganic filler and inorganic binder. The resulting material is dried (for example, at 170° C.×30 minutes), and then subjected to heat treatment (for example, at 500° C.×3 hours) to produce a structure having a desired shape.

The structure of the present invention is preferably honeycomb. This arrangement provides the structure with an increased area of contact with an exhaust gas and an enhanced strength.

The glass fiber free of $B_2O_3$ may be formed into nonwoven fabric or cloth.

The present invention will be further described in the following examples, but the present invention should not be construed as being limited thereto.

EXAMPLE 1

The glass fiber having a composition set forth in Table 1 (diameter: 9 μm; length: 9 mm) was dispersed in a polyvinyl alcohol solution as a binder. The suspension thus obtained was then subjected to paper making to obtain a glass paper. The glass paper thus produced was then passed through the gap between a pair of corrugated rolls arranged vertically so that it was subjected to corrugation process. A plurality of sheets of the glass paper thus treated were then laminated. Fluorite (5-mesh) was then applied to the laminate with a silica gel ($SiO_2$ content: 20%) as a binder. The coated material was dried, and then subjected to heat treatment to obtain a honeycomb structure. The honeycomb structure thus obtained was then impregnated with $TiO_2$, $WO_3$ and $V_2O_5$ ($TiO_2:WO_3:V_2O_3=100:9$ to 12:1 to 8 by weight) powders together with a silica sol ($SiO_2$ content: 20%), dried, and then subjected to heat treatment at 400° C. to obtain a denigration catalyst.

COMPARATIVE EXAMPLE 1

The procedure of Example 1 was followed except that a ceramic fiber (diameter: 9 μm; length: 9 mm) comprising 52.0% by weight of $SiO_2$ and 48.0% by weight of $Al_2O_3$ was used. Thus, a denitration catalyst was obtained.

COMPARATIVE EXAMPLE 2

The procedure of Example 1 was followed except that an E-glass fiber (diameter: 9 μm; length: 9 mm) having a composition set forth in Table 1 was used. Thus, a denitration catalyst was obtained.

The denitration catalysts obtained in the foregoing examples and comparative examples were then exposed to an exhaust gas having a sulfur oxide concentration of 500 ppm at a temperature of 350° C. for 1,000 hours. These denitration catalysts were measured for compression strength before and after the exposure test. The percent residue of compression strength [(Compression strength after exposure)/(Compression strength before exposure)× 100 (%)] is set forth in Table 1 below.

TABLE 1

| (Composition) | Example 1 (wt- %) | Comparative Example 1 (wt- %) | Comparative Example 2 (wt- %) |
|---|---|---|---|
| $SiO_2$ | 58.40 | 52.0 | 55.50 |
| $Al_2O_3$ | 11.90 | 48.0 | 14.10 |
| CaO | 21.70 | — | 22.40 |
| $TiO_2$ | 2.00 | — | — |
| MgO | 2.48 | — | 2.70 |
| ZnO | 2.98 | — | — |
| $Na_2O$ | 0.02 | — | 0.40 |
| $K_2O$ | 0.46 | — | 0.10 |
| $Fe_2O$ | 0.07 | — | 0.40 |
| $B_2O_3$ | — | — | 7.20 |
| % Residue of Compression Strength | 80 | 10 | 10 |

As can be seen in Table 1, the denitration catalyst of the example according to the present invention exhibits a remarkably high percent residue of compression strength as compared with that of the comparative examples. It was thus confirmed that the denitration catalyst according to the present invention exhibits an excellent acid resistance and hence can be sufficiently used even for the purpose of denitrating an exhaust gas containing sulfur oxides.

As mentioned above, the present invention involves the use of a glass fiber free of $B_2O_3$ and having a minimized content of $Al_2O_3$ as a carrier, making it possible to provide a denitration catalyst which shows no deterioration of the carrier and hence minimized drop of life even when used for the denigration of an exhaust gas containing sulfur oxides while maintaining both high water resistance and electrical insulating properties inherent to glass fibers.

While the invention has been described in detail and with reference to specific embodiments thereof, it will be apparent to one skilled in the art that various changes and modifications can be made therein without departing from the spirit and scope thereof.

What is claimed is:

1. A denitration catalyst, comprising a catalytically active component supported on a structure comprising a glass fiber free of $B_2O_3$, an inorganic filler and an inorganic binder.

2. The denitration catalyst according to claim 1, wherein said glass fiber contains an $Al_2O_3$ component in an amount of from 10 to 19% by weight.

3. The denitration catalyst according to claim 1, wherein said glass fiber has a diameter of from 3 to 16 $\mu$m.

4. The denitration catalyst according to claim 1, wherein said inorganic filler is $SiO_2$.

5. The denitration catalyst according to claim 1, wherein said inorganic binder comprises at least one selected from the group consisting of calcined silica sol, calcined zirconia sol and calcined titania sol.

6. The denitration catalyst according to claim 1, wherein said structure is honeycomb.

7. The denitration catalyst according to claim 1, wherein said catalytically active component comprises at least one selected from the group consisting of Ti oxide, W oxide, Mo oxide and V oxide.

8. A process for the production of a denitration catalyst, which comprises the steps of:

subjecting a mixture of a glass fiber free of $B_2O_3$ and a binder to paper making to produce a glass paper, subjecting said glass paper to corrugation processing, laminating or rolling up said glass paper thus processed, applying an inorganic filler to said processed glass paper with an inorganic binder, drying said processed glass paper, subjecting said processed glass paper to heat treatment to thereby obtain a honeycomb structure, allowing a catalytically active component to be supported on said honeycomb structure with an inorganic binder, drying said honeycomb structure, and subjecting said honeycomb structure to heat treatment.

* * * * *